June 29, 1954    F. A. SCHUMANN, SR    2,682,130
ANIMAL TRAP
Filed July 5, 1951    2 Sheets-Sheet 1
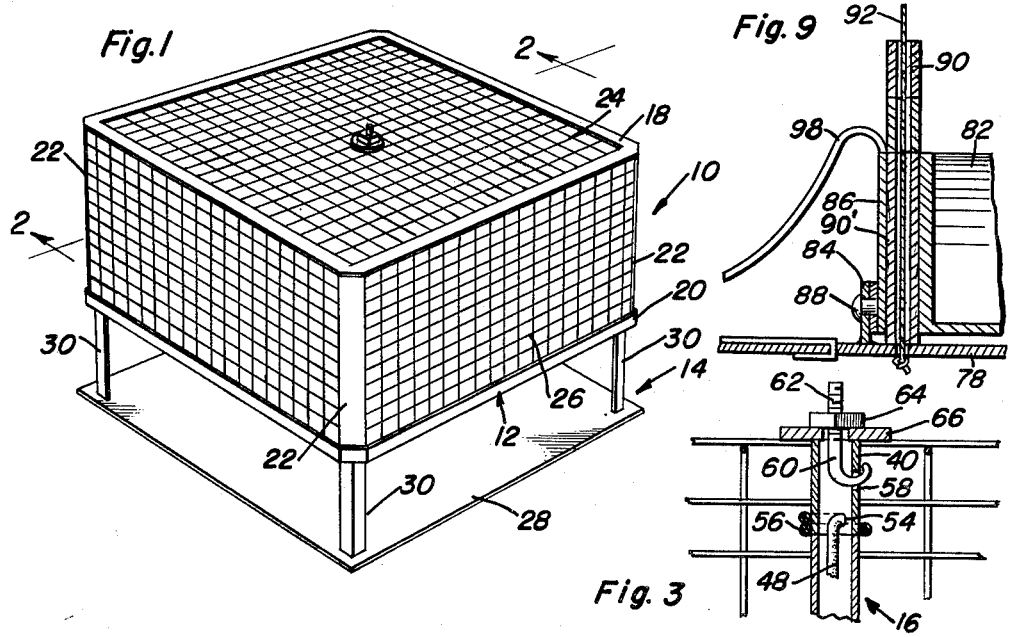
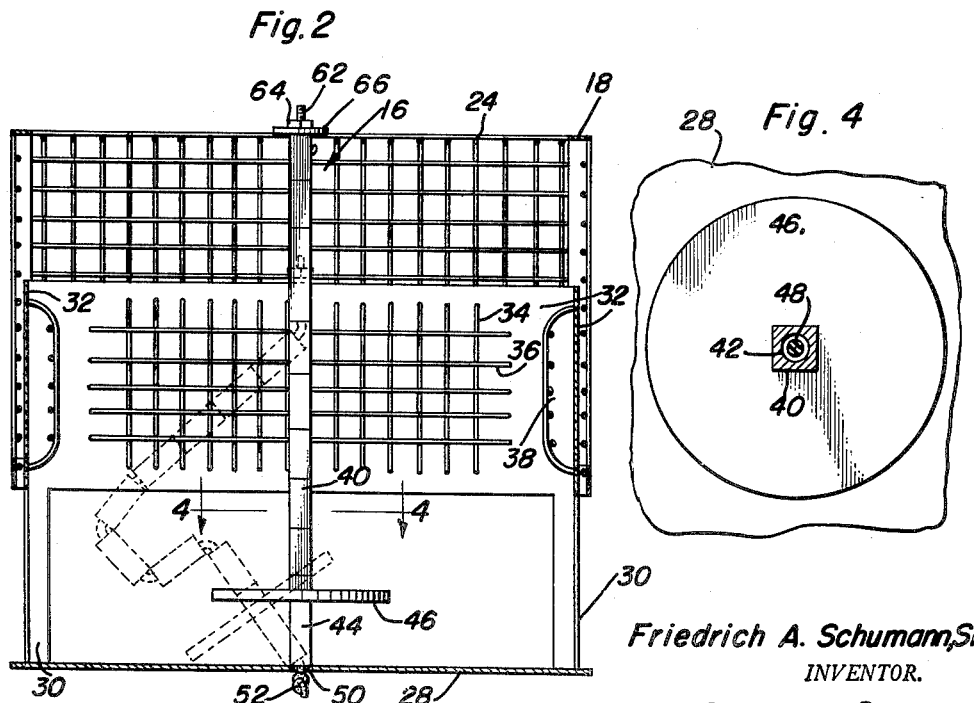
Friedrich A. Schumann, Sr.
INVENTOR.

June 29, 1954     F. A. SCHUMANN, SR     2,682,130
ANIMAL TRAP

Filed July 5, 1951                              2 Sheets-Sheet 2

Friedrich A. Schumann, Sr.
INVENTOR.

BY *Clarence A. O'Brien*
*and Harvey B. Jacobson*
Attorneys

Patented June 29, 1954

2,682,130

UNITED STATES PATENT OFFICE 2,682,130

ANIMAL TRAP

Friedrich A. Schumann, Sr., Omaha, Nebr.

Application July 5, 1951, Serial No. 235,221

5 Claims. (Cl. 43—62)

The present invention relates to improvements in animal traps and more particularly to a trap which obviates the necessity of steel actuating springs.

An object of the present invention resides in the provision of a wire cage which is reciprocably carried by a base for cooperation therewith to constitute a trap and wherein the wire cage is adapted to be maintained in raised relation to the base by collapsible means which can be collapsed upon contact by an animal seeking bait in the trap.

A further object of the present invention resides in the provision of a collapsible means for supporting a wire cage in raised relation to a base and wherein the collapsible means is associated with a bait holding tray whereby when an animal contacts the tray for removing the bait within the tray, the collapsible means will be collapsed, thereby dropping the cage over the animal.

Still another object of the present invention resides in the provision of a cage and base combination wherein the base is provided with upright standards for supporting a bait holding means in raised relation to the base, and a collapsible means for maintaining the cage in raised relation to the base having a platform associated therewith whereby when an animal steps on the platform to reach the bait, the collapsible means will become collapsed and the cage will fall trapping the animal therein.

Various other objects and advantages will become apparent from the detailed description to follow. The best forms in which I have contemplated applying my invention are clearly illustrated in the accompanying drawings, wherein:

Figure 1 is a detail perspective view of the first form of animal trap;

Figure 2 is a vertical transverse sectional view taken substantially along the plane of line 2—2 of Figure 1;

Figure 3 is a detail sectional view showing the manner in which the collapsible means is connected to the cage;

Figure 4 is a horizontal sectional view taken substantially along the plane of line 4—4 of Figure 2;

Figure 9 is a vertical longitudinal sectional view taken on the line 9—9 of Figure 8.

Figure 5:
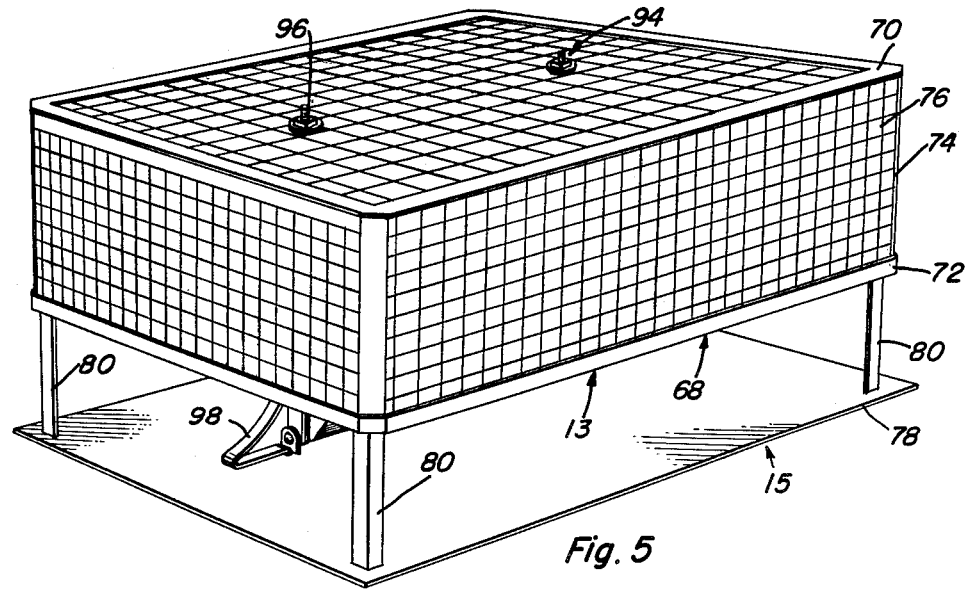
Figure 5 is a detail perspective view of the second form of animal trap.
Figure 6:
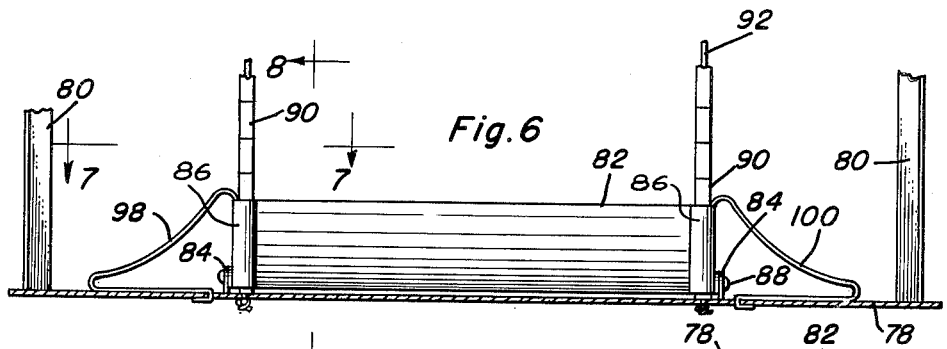
Figure 6 is a side elevational view of the bait holding and associated elements of the second form of the invention.
Figure 7:
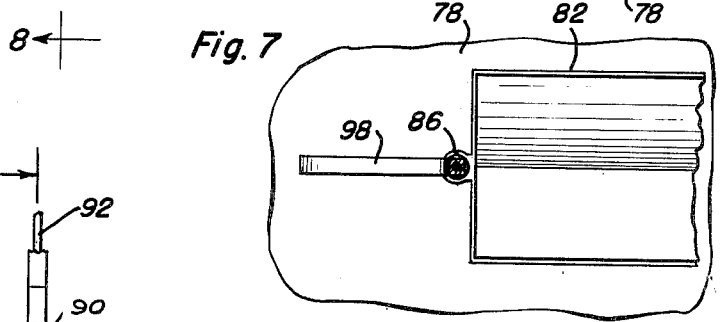
Figure 7 is a horizontal longitudinal sectional view taken substantially along the plane of line 7—7 of Figure 6.

Referring more particularly to the drawings, wherein like numerals designate like parts throughout, the numeral 10 designates generally the first form of animal trap which is comprised of a cage 12, base 14 and collapsible means 16.

Referring more particularly to Figures 1 through 4, the animal trap 10 will be described in detail. The cage 12 is comprised of rectangular frame elements 18 and 20 joined by a plurality of vertically extending frame elements 22 which maintain the rectangular frame elements 18 and 20 in spaced parallel relation. Wire mesh 24 is welded to the frame elements to provide a cage having an open bottom 26.

The base 14 is comprised of an enlarged rectangular plate 28 having four angle iron standards 30 fixedly secured thereto for engagement in the corners of the cage 12 whereby the cage 12 can reciprocate relative to the base plate 28.

As seen best in Figure 2, the base 14 has four rectangular plates 32 fixedly secured together to provide an open ended four sided retaining wall which is supported at its corners by the standards 30 which are formed integrally therewith. Fixedly secured to the plates 32 are a plurality of wire elements 34 and 36 in perpendicular relation to each other whereby reticulated bait receiving chambers 38 are provided on the four plates 32 inside said retaining wall.

The collapsible means 16 for supporting the cage 12 in raised relation to the base plate 28 is comprised of a plurality of rectangularly cross-sectioned elongated elements 40 and 44 formed with longitudinal bores 42 therethrough. The lowermost element 44 has an enlarged disk 46 secured thereto and lying in a plane perpendicular to the element 44 for a purpose to be hereinafter more fully understood. A resilient cord 48 extends through the bores 42 of the elements 40 and 44, the lower end of the cord 48 extending through the aperture 50 in the base plate 28, where it is knotted at 52 for retention by the base plate 28. The opposing end of the cord 48 extends through the openings 54 in the uppermost element 40, as seen best in Figure 3, where it is wound around the element 40 as at 56. The cord 56 is tied to the uppermost element 40 so that the plurality of elements 40 and 44 are resiliently urged together.

It will thus be seen that the plurality of elements 40 and 44 can be placed end to end as shown in full lines in Figure 2 whereby the cage 12 can be supported in spaced relation to the base plate 28. In order to secure the cage 12 to the collapsible means 16, the uppermost element 40 has an aperture 58 formed therein whereby the hook 60 can be engaged therethrough. The hook 60 is threaded at 62 and has a nut 64 threadably engaged thereon for abutment against the washer 66 at the upper face of the cage 12.

In view of the foregoing, it will be seen that the animal trap is set by raising the cage 12 relative to the base plate 28 and maintaining the cage in raised relation by clamping the blocks or elements 40 and 44 in end to end relation as shown in Figure 2. Bait is placed in the bait chambers 38. When an animal enters the trap and steps on the platform 46 for access to the bait, the collapsible means 16 will colapse as shown in dotted lines in Figure 2 thereby permitting the cage 12 to drop towards the base plate 28, trapping the animal therein.

A second form of the invention 13 is best disclosed in Figures 5 through 9 as including an elongated cage 68 including upper and lower rectangular frame elements 70 and 72 joined by the vertically extending frame elements 74, wire mesh means 76 being secured to the frame elements in the same manner as in the first form of the invention. The base 15 is comprised of an elongated rectangular base plate 78 having a plurality of angle iron standards 80 fixedly secured thereto for engagement with the corners of the cage 68, so that the cage 68 can reciprocate relative to the base plate 78 in the same manner as the cage 12.

The base plate 78 has mounted thereon an elongated V-shaped tray 82 pivotally carried by the brackets 84, the tray 82 being provided as a bait retainer. The opposing ends of the tray 82 have hollow extension portions 86 from which the pins 88 extend for rotatably journaling the pins 88 in the brackets 84.

The upper and lower ends of the extensions 86 are open so that said extensions receive the lowermost blocks or elements 90'. A plurality of blocks 90 and 90' are carried by the extensions 86 at each end of the tray 82, flexible cords 92 being employed for securing the blocks 90 and 90' together in the same manner as shown in Figure 2, the uppermost blocks 90 being detachably secured to the upper face of the cage 68 by a hook 60, in the same manner and by the same means as described with reference to the first described form as shown in Figure 3. A pair of resilient flat strap springs 98 and 100 are provided for engagement with the upper ends of the extensions 86 for normally maintaining the tray 82 in its vertical "set" position.

This second form of trap is set in the same manner as the first described form with the blocks 90, 90' arranged coaxially end to end and perpendicular to the base plate 78 and the lowermost blocks 90' seated on the base plate 78 so that the blocks support the cage 68 raised above the base plate 78 and tray 82 is held upright.

Figure 8:
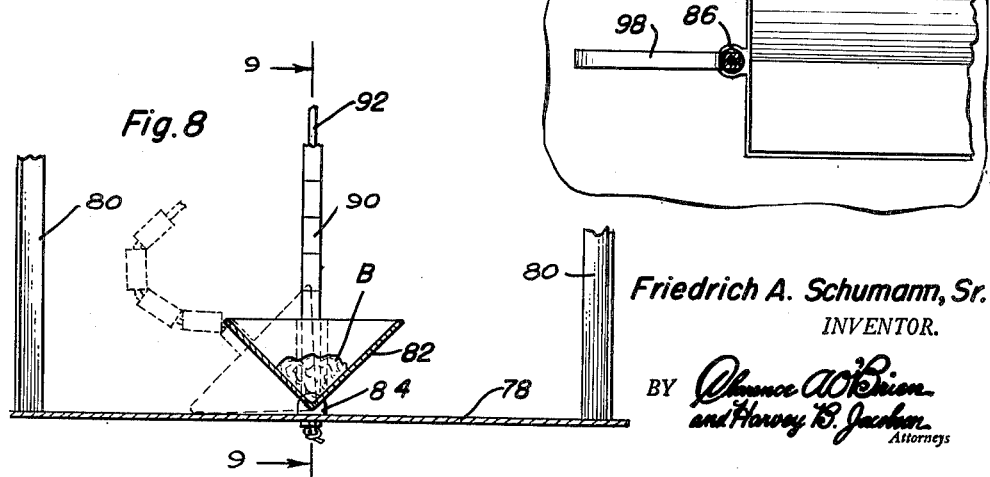
Figure 8 is a vertical transverse sectional view taken substantially along the plane of line 8—8 of Figure 6.

Thus, with the trap set as partially shown in full lines in Figure 8, an animal will be lured beneath the cage 68 to the bait B. Upon contact with the tray 82 while eating the bait B, the animal will cause the blocks 90 and 90' to tumble or collapse to the dotted line position of Figure 8 whereby the cage 68 will drop towards the base plate 78 to trap the animal.

In view of the foregoing, it is believed that a device has been provided which will accomplish all of the objects hereinabove set forth.

Having described the invention, what is claimed as new is:

1. An animal trap comprising a base plate having a plurality of guide standards secured thereto, a wire mesh cage having an open bottom, said cage being vertically reciprocably guided by said standards, a collapsible means supporting said cage in raised relation from said base plate, said collapsible means comprising at least one post rising from and seating on the base plate and including a plurality of separable, tubular segments superposed upon one another, resilient means extending through said segments and maintaining them in abutting relation to each other, means detachably connecting the upper segment of said segments to the top of said cage to maintain said segments axially aligned relative to each other when said cage is in raised relation to the base plate, one end of said resilient means being secured to said uppermost segment and the other end being secured adjacent the lowermost of said segments to said base plate, said collapsible means being adapted to collapse upon lateral pressure thereagainst, bait holding means secured to the guide standards, and a disk secured to the lower portion of said collapsible means whereby when an animal steps on the disk to gain access to the bait, the collapsible means will collapse causing the cage to drop and trap the animal.

2. An animal trap comprising a base plate having a plurality of guide standards secured thereto, a wire mesh cage having an open bottom, said cage being vertically reciprocably guided by said standards, a collapsible means supporting said cage in raised relation from said base plate, said collapsible means comprising at least one post rising from and seating on the base plate and including a plurality of separable, tubular segments superposed upon one another, resilient means extending through said segments and maintaining them in abutting relation to each other, means detachably connecting the upper segment of said segments to the top of said cage to maintain said segments axially aligned relative to each other when said cage is in raised relation to the base plate, one end of said resilient means being secured to said uppermost segment and the other end being secured adjacent the lowermost of said segments to said base plate, said collapsible means being adapted to collapse upon lateral pressure thereagainst, and means associated with said collapsible means which upon contact by an animal seeking bait within the trap will effect collapse of the collapsible means and trapping of the animal.

3. An animal trap comprising a base plate having a plurality of guide standards secured thereto, a wire mesh cage having an open bottom, said cage being vertically reciprocably guided by said standards, a collapsible means supporting said cage in raised relation from said base plate, said collapsible means comprising at least one post rising from and seating on the base plate and including a plurality of separable, tubular segments superposed upon one another, resilient means extending through said segments and maintaining them in abutting relation to each other, means detachably connecting the upper segment of said segments to the top of said cage to maintain said segments axially aligned relative to each other when said cage is in raised relation to the base plate, one end of said resilient means being secured to said uppermost segment and the other end being secured adjacent the lowermost of said segments to said base plate, said collapsible means being adapted to collapse upon lateral pressure thereagainst, bait holding means pivotally carried by said base plate and providing a support for said collapsible means whereby when an animal feeds on the bait and tips the bait holding means, the collapsible means will collapse and the cage will trap the animal therein, said bait holding means including an elongated tray, and strap springs on said base plate maintaining said tray in upstanding position.

4. An animal trap comprising a base plate having a plurality of guide standards secured thereto, a wire mesh cage having an open bottom, said cage being vertically reciprocably guided by said standards, a collapsible means supporting said cage in raised relation from said base plate, said collapsible means comprising at least one post rising from and seating on the base plate and including a plurality of separable, tubular segments superposed upon one another, resilient means extending through said segments and maintaining them in abutting relation to each other, means detachably connecting the upper segment of said segments to the top of said cage to maintain said segments axially aligned relative to each other when said cage is in raised relation to the base plate, one end of said resilient means being secured to said uppermost segment and the other end being secured adjacent the lowermost of said segments to said base plate, said collapsible means being adapted to collapse upon lateral pressure thereagainst, and bait holding means pivotally carried by said base and providing a support for said collapsible means whereby when an animal feeds on the bait and tips the bait holding means, the collapsible means will collapse and the cage will trap the animal therein.

5. An animal trap comprising a base plate having a plurality of guide standards secured thereto, a wire mesh cage having an open bottom, said cage being vertically slidable on said standards, a collapsible means supporting said cage in raised relation from said base plate, said collapsible means comprising at least one post rising from and seating on said base plate and including a plurality of separable, tubular segments superposed upon one another, resilient means extending through said segments and maintaining them in abutting relation to one another, and means detachably connecting the uppermost of said segments to the top of said cage to maintain said segments axially aligned relative to each other when said cage is in raised relation to said base plate, one end of said resilient means being secured to said uppermost segment and the other end being secured adjacent the lowermost of said segments to said base plate, said collapsible means being adapted to collapse upon lateral pressure thereagainst.

References Cited in the file of this patent

UNITED STATES PATENTS

| Number | Name | Date |
| --- | --- | --- |
| 215,308 | Witt | May 13, 1879 |
| 1,088,477 | De St. Legier | Feb. 24, 1914 |
| 1,425,355 | Yamasaki | Aug. 8, 1922 |